(12) United States Patent
Chao et al.

(10) Patent No.: US 7,970,288 B2
(45) Date of Patent: Jun. 28, 2011

(54) ELECTRONIC SYSTEM WITH APC

(75) Inventors: Kuo-Hao Chao, Taipei Hsien (TW); Po-Ching Huang, Tainan (TW)

(73) Assignee: Mediatek Inc., Hsin-Chu (TW)

( * ) Notice: Subject to any disclaimer, the term of this patent is extended or adjusted under 35 U.S.C. 154(b) by 712 days.

(21) Appl. No.: 11/924,771

(22) Filed: Oct. 26, 2007

(65) Prior Publication Data

US 2008/0100271 A1 May 1, 2008

Related U.S. Application Data

(60) Provisional application No. 60/863,394, filed on Oct. 30, 2006.

(51) Int. Cl.
*H04B 10/00* (2006.01)

(52) U.S. Cl. ......... 398/192; 398/194; 398/136; 398/137

(58) Field of Classification Search ............... 398/33, 398/136, 137, 192, 194, 197

See application file for complete search history.

(56) References Cited

U.S. PATENT DOCUMENTS

| | | | | |
|---|---|---|---|---|
| 4,907,236 A * | 3/1990 | Shimada | ............ | 372/31 |
| 5,404,586 A * | 4/1995 | Ishiguro | ............ | 455/126 |
| 5,513,029 A * | 4/1996 | Roberts | ............ | 398/32 |
| 6,738,584 B1 * | 5/2004 | Tsuda et al. | ............ | 398/147 |
| 6,748,181 B2 * | 6/2004 | Miki et al. | ............ | 398/195 |
| 2004/0188591 A1 * | 9/2004 | Hsu et al. | ............ | 250/205 |
| 2005/0025259 A1 * | 2/2005 | Miyasita | ............ | 375/319 |
| 2005/0201761 A1 * | 9/2005 | Bartur et al. | ............ | 398/197 |
| 2005/0227646 A1 | 10/2005 | Yamazaki et al. | | |

OTHER PUBLICATIONS

Kasei, A.; "AK2573A,125M/156M Laser Diode Driver+APC;" May 2004; pp. 1-20.
Sony; "CXB1594Q,Laser Diode Driver;" 1998; pp. 1-38.

* cited by examiner

*Primary Examiner* — Dalzid Singh
(74) *Attorney, Agent, or Firm* — Thomas|Kayden (57) ABSTRACT

An electronic system comprises an automatic power control (APC) unit, an adjustment unit, and a calibration unit. The automatic power control (APC) unit receives a first input signal and a second input signal and generates an output signal. An adjustment unit coupled to the first input terminal of the APC unit generates a voltage offset according to an adjustment signal. The calibration unit provides the adjustment signal with a series of values. The calibration unit monitors the output signal until the output signal changes states.

16 Claims, 9 Drawing Sheets

ELECTRONIC SYSTEM WITH APC

CROSS REFERENCE TO RELATED APPLICATIONS

This application claims the benefit of U.S. Provisional Application No. 60/863,394, filed Oct. 30, 2006, which is incorporated herein by reference.

BACKGROUND OF THE INVENTION

1. Field of the Invention

The invention relates to a control device, and more particularly to a control device for compensating path mismatching in an automatic power control circuit.

2. Description of the Related Art

Figure 8:
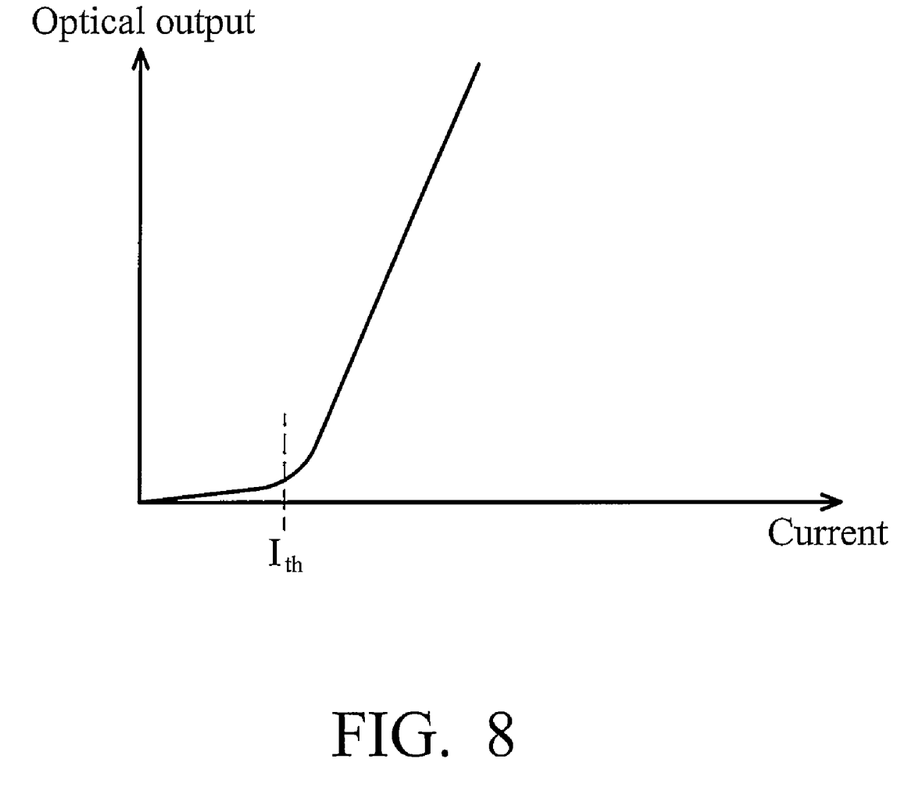
FIG. 8 shows a characteristic curve of a laser diode.

FIG. 8 shows a characteristic curve of a laser diode. When an input current provided to a laser diode is less than a threshold current $I_{th}$, the laser diode serves as a light-emitting diode (LED), thus, light emitted from the laser diode is less bright. When the input current exceeds the threshold current $I_{th}$, the light emitted from the laser diode increases rapidly when the input current increases.

When temperature increases, the threshold current $I_{th}$ increases. Thus, an automatic power control (APC) circuit is added for controlling the input current. The APC circuit, however, suffers from mismatching due to manufacturing procedures.

BRIEF SUMMARY OF THE INVENTION

An electronic system is provided. The electronic system comprises an automatic power control (APC) unit, an adjustment unit, and a calibration unit. The automatic power control (APC) unit receives a first input signal through a first input terminal and receives a second input signal through a second input terminal. The APC unit generates an output signal. The adjustment unit is coupled to the first input terminal. The adjustment unit generates a voltage offset according to an adjustment signal. The calibration unit provides the adjustment signal with a series of values. The calibration unit monitors the output signal until the output signal changes states. The calibration unit can comprise a firmware unit. In another embodiment, the calibration unit can be an internal logic circuit implemented within an integrated circuit.

A calibration method is also provided. The calibration method is for calibrating a voltage offset of a first input terminal and a second input terminal of an amplifier. The method comprises the following steps. First, a first input signal and a second input signal are provided to the first input terminal and the second input terminal respectively. Next, an adjustment signal with a series of values is provided to the first input terminal of the amplifier. Each value sets a voltage adjustment to the first input terminal. Then, an output signal of the amplifier is monitored until the output signal changes states. Subsequently, the voltage adjustment made to the first input terminal when the output signal changes states is selected.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
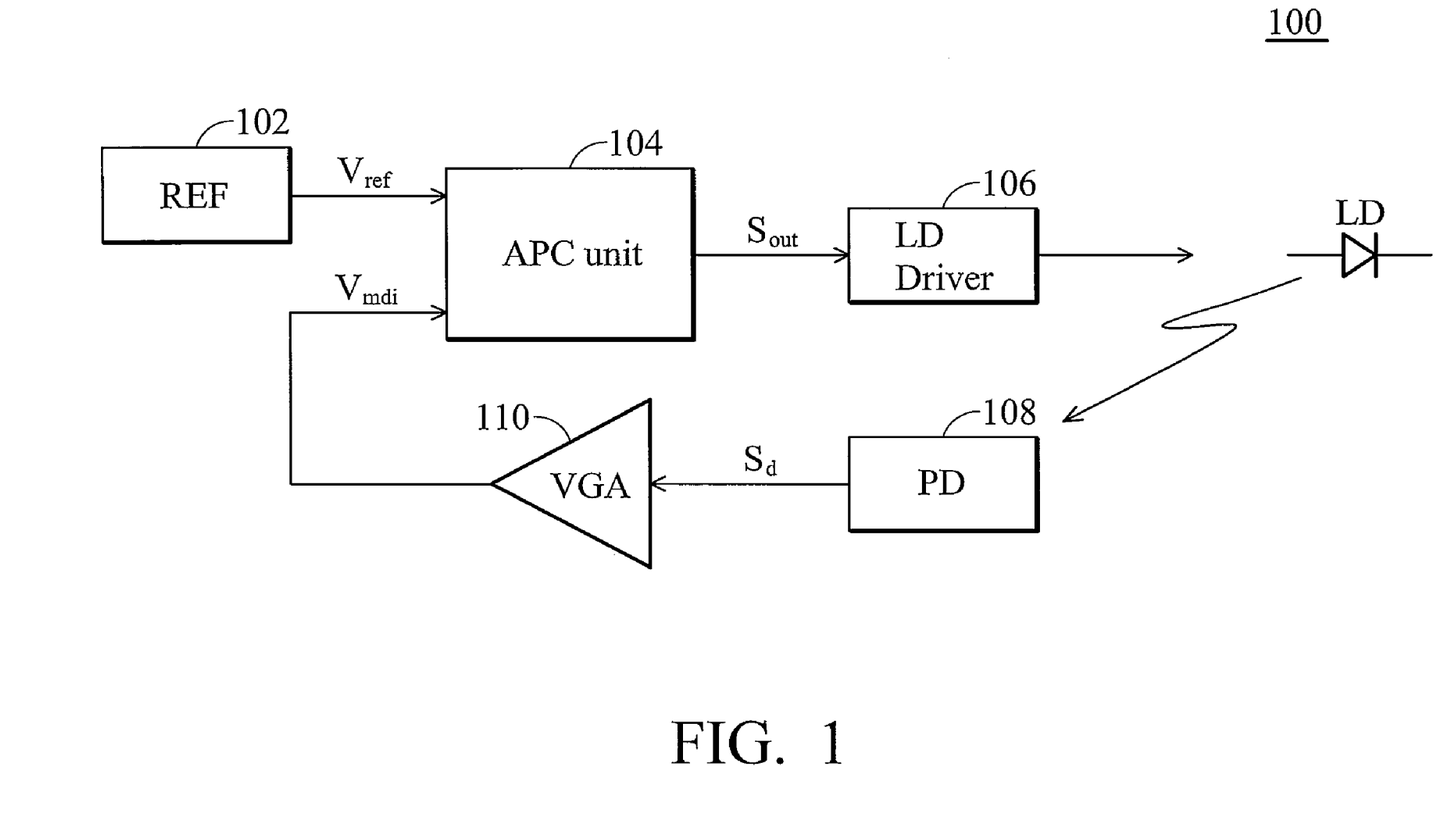
FIG. 1 shows an electronic system for driving a laser diode in a close loop.

FIG. 1 shows an electronic system for driving a laser diode in a normal mode. The electronic system 100 comprises a reference signal source 102, an automatic power control unit (APC unit) 104, a laser diode driver (LD driver) 106, a power detector (PD) 108, and a variable gain amplifier (VGA) 110. In this embodiment, a reference signal source 102 generates a reference voltage ($V_{ref}$). The APC unit 104 receives the reference voltage $V_{ref}$ and a voltage $V_{mdi}$ and generates an output signal $S_{out}$. The LD driver 106 provides a current to drive the laser diode (LD) according to the output signal $S_{out}$. The power detector PD 108 detects the power of the light emitted from the laser diode LD and generates a detection signal $S_d$. The variable gain amplifier VGA amplifies the detection signal $S_d$ with a gain and outputs the voltage $V_{mdi}$.

In this embodiment, the APC unit includes an operational amplifier OP. The electronic system 100 forms a close loop with negative feedback. Therefore, the voltage $V_{mdi}$ is the same as the reference voltage $V_{ref}$. The electronic system 100 can keep the power of the laser diode stable using the APC unit and the close loop configuration. By adjusting $V_{ref}$, the electronic system 100 can adjust the power of the laser diode LD.

However, the reference voltage $V_{ref}$ may not be perfectly match the voltage $V_{mdi}$ because of the voltage offset between an inverting terminal and non-inverting terminal of the operational amplifier OP in the APC unit 104. Voltage offset can also occur on the paths coupled to the inverting and non-inverting terminal if there are additional components (level shifters or another OP) located on the paths. For example, if the reference voltage $V_{ref}$ is set to be 180 mV, the voltage $V_{mdi}$ could be 170 mV when the close loop is stable. There is a 10 mV voltage offset between the reference voltage $V_{ref}$ and the voltage $V_{mdi}$ in this case.

Figure 3A:
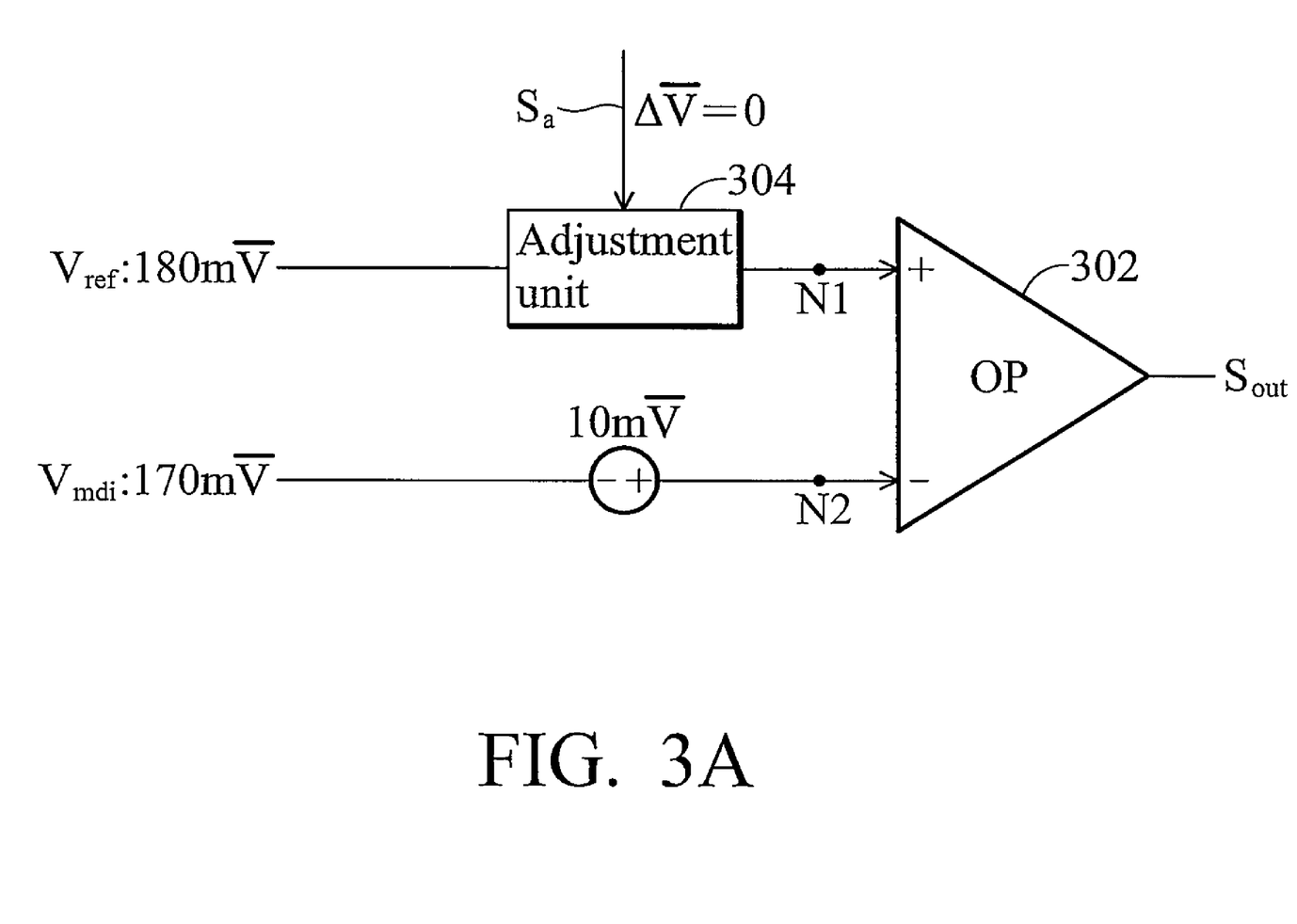
FIG. 3A and FIG. 3B show an operational amplifier with voltage adjustment made to one terminal.
Figure 3B:
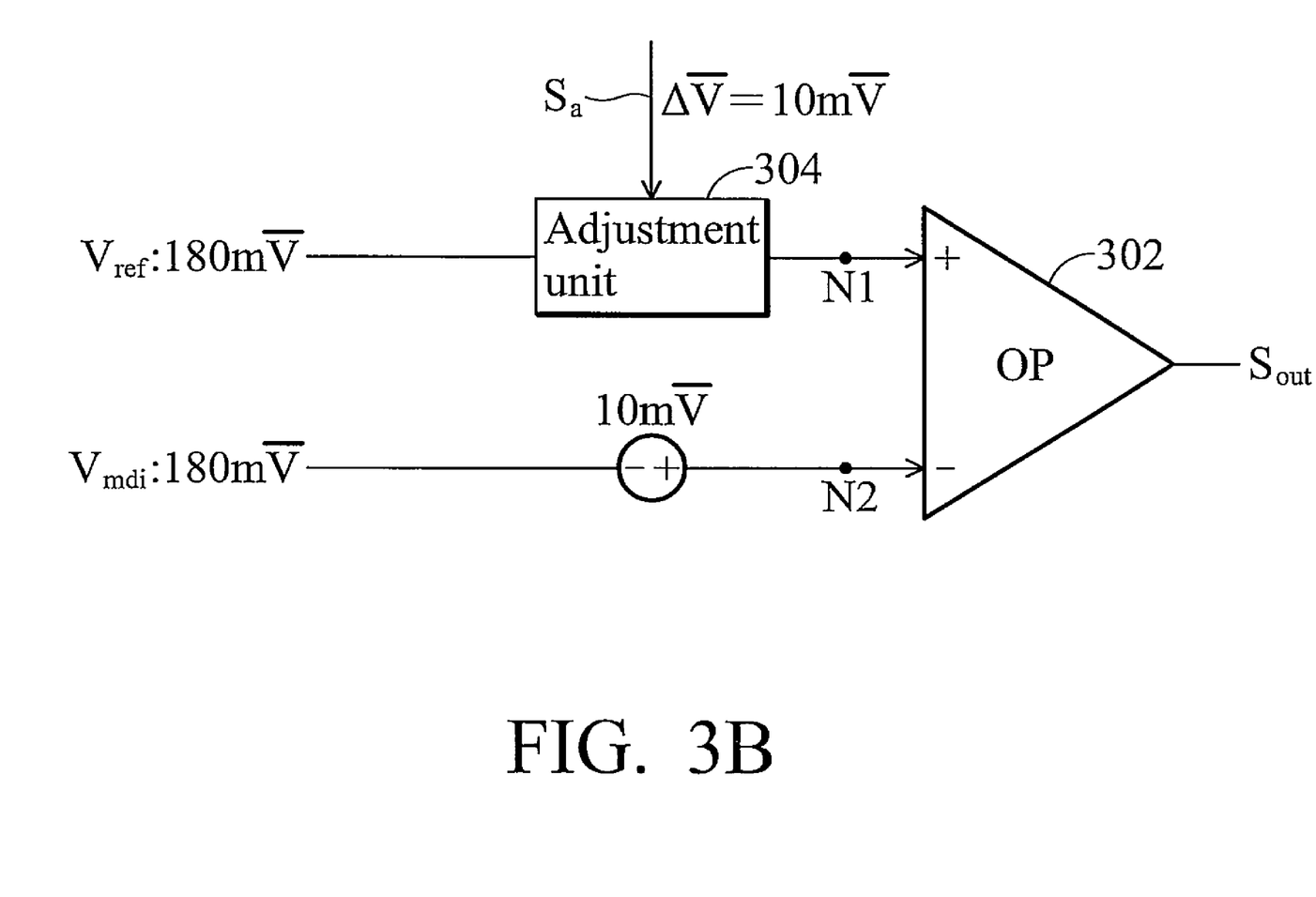

For example, with reference to FIG. 3A and FIG. 3B, the operational amplifier OP 302 represents an ideal OP without input voltage offset. The 10 mV appears on the inverting terminal of the OP 302 represents the original voltage offset. The original voltage offset is an equivalent voltage offset including all voltage offsets caused by non-ideal factors of the electronic system 100. The adjustment unit 304 is placed on the non-inverting terminal and is used to provide a variable voltage offset according to adjustment signal $S_a$. The adjustment signal $S_a$ is determined by the register value stored in the register unit 210.

With reference to FIG. 3A, it is assumed that the reference voltage $V_{ref}$ is 180 mV. If no voltage adjustment is made to the non-inverting terminal ($\Delta V=0$), the voltage on the node N1 is the same as the reference voltage $V_{ref}$, which is 180 mV. The voltage on the node N2 would also be 180 mV if a close loop with negative feedback configuration is formed. In this case, the voltage $V_{mdi}$ would be 170 mV, which is not equal to the reference voltage $V_{ref}$ (180 mV). The 10 mV voltage offset needs to be compensated.

With reference to FIG. 3B, if a voltage adjustment 10 mV ($\Delta V=10$ mV) is made to the non-inverting terminal, the voltage on N1 would become 190 mV. The voltage on the node N2 would also be 190 mV if a close loop with negative feedback configuration is formed. In this case, the voltage $V_{mdi}$ would be 180 mV, which is equal to the reference voltage $V_{ref}$ (180 mV). The 10 mV voltage offset is compensated.

Figure 2:
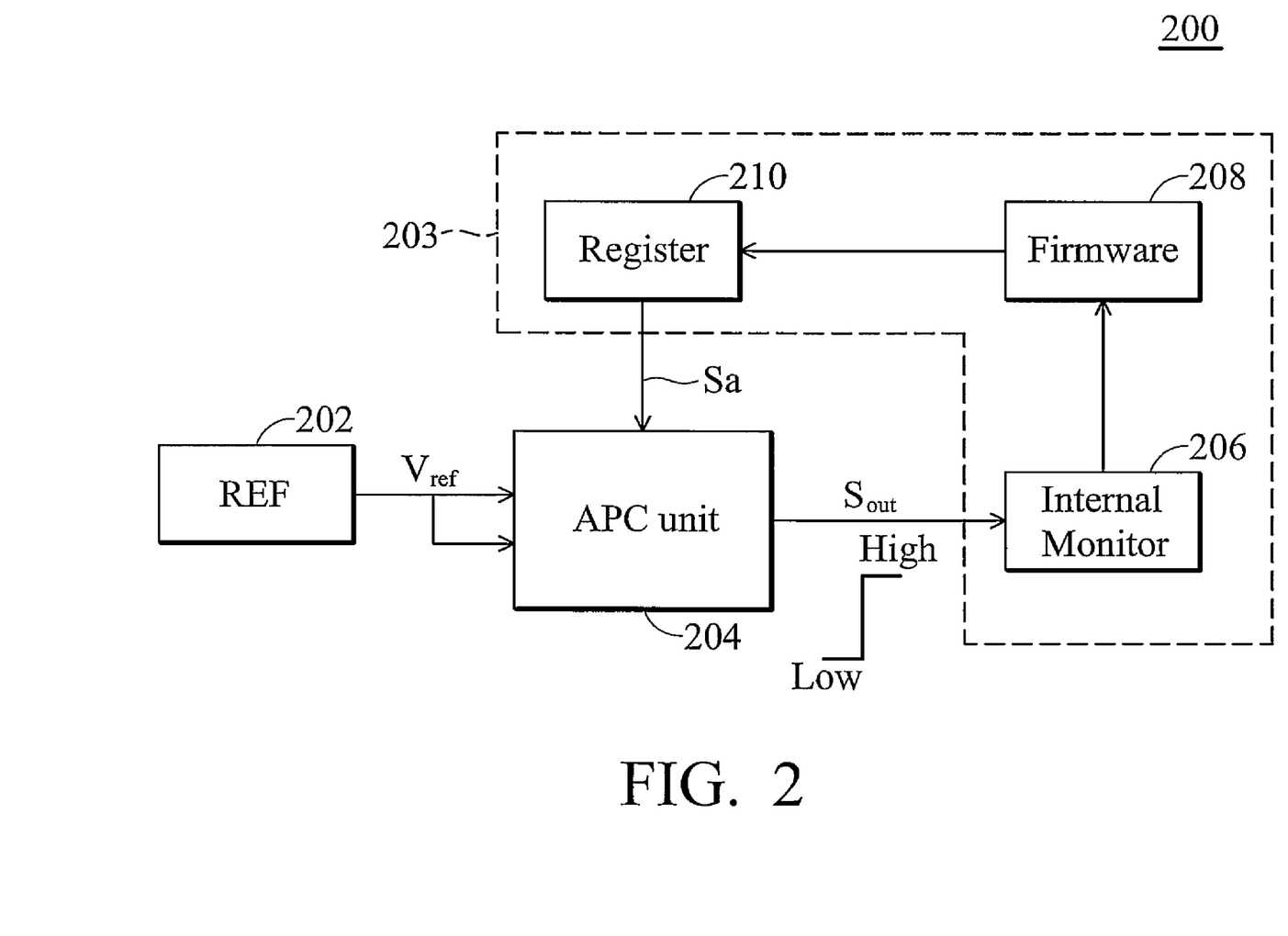
FIG. 2 shows an electronic system in a calibration mode.

A calibration process is therefore needed to detect the original voltage offset and to compensate for it. FIG. 2 shows an electronic system in a calibration mode. The electronic system comprises a reference signal source 202, an automatic power control unit (APC unit) 204, and a calibration unit 203. The calibration unit 203 comprises an internal monitor 206, a firmware unit 208, and a register unit 210. The adjustment unit 304 can be located outside or within the APC unit 204. The electronic system 200 is configured as open loop because it is in a calibration mode. One purpose of the calibration mode is to determine the original voltage offset between the inverting and non-inverting terminals and then to compensate for original the voltage offset.

The register value stored in the register unit 210 can be used to adjust voltage offset of one terminal of the APC unit 204. The firmware unit 208 changes the register value stored in the register unit 210 step by step, so that the voltage offset is adjusted step by step. For example, the voltage adjustment $\Delta V$ can be set from $-30$ mV to $+30$ mV with a step size of 6 mV. The resulting voltage adjustment $\Delta V$ is $-30$ mV, $-24$ mV, $-18$ mV, and so on. In another embodiment, the voltage adjustment $\Delta V$ can be set from high to low (from $+30$ mV to $-30$ mV for example) and the step size can also be changed depending on different calibration requirements.

In this embodiment, both inverting and non-inverting terminal of the APC unit 204 are coupled to the reference voltage $V_{ref}$, and the APC unit is operated as a comparator. When the voltage adjustment $\Delta V$ changes, the internal monitor 206 monitors the output signal $S_{out}$. Once the output signal $S_{out}$ changes states (from low to high or from high to low), the firmware unit 208 stops changing the register value and the current register value is recorded or maintained.

For example, with reference to FIG. 2, FIG. 3A and FIG. 3B, $\Delta V$ increases from $-30$ mV with a step size of 6 mV. When $\Delta V$ reaches the value 10 mV, the output signal $S_{out}$ changes states (from low to high) and the firmware unit 208 stops changing the register value. A voltage adjustment 10 mV is obtained.

In another embodiment, the voltage adjustment can be made to the inverting terminal of the OP 302. In still another embodiment, voltage adjustments are made to both two input terminals of the OP 302. The firmware unit can control two voltage adjustments with process similar to the embodiment shown in FIG. 2, FIG. 3A, and FIG. 3B. The firmware unit 208 unit can be implemented by a micro processor and ROM (read only memory), which is known by persons skilled in the art. The firmware unit 208 can be re-written or changed according to different requirements even if the IC has been packaged.

One advantage of this embodiment is that the calibration process can be performed after an integrated circuit (IC) has been packaged. The firmware unit 208 can be located on a PCB (printed circuit board). The reference signal source 202, the APC unit 204, the internal monitor 206, and the register unit 210 can be implemented within the IC. The calibration process can be carried out every time the electronic system 200 is turned on (powered up) by an end user.

Figure 4:
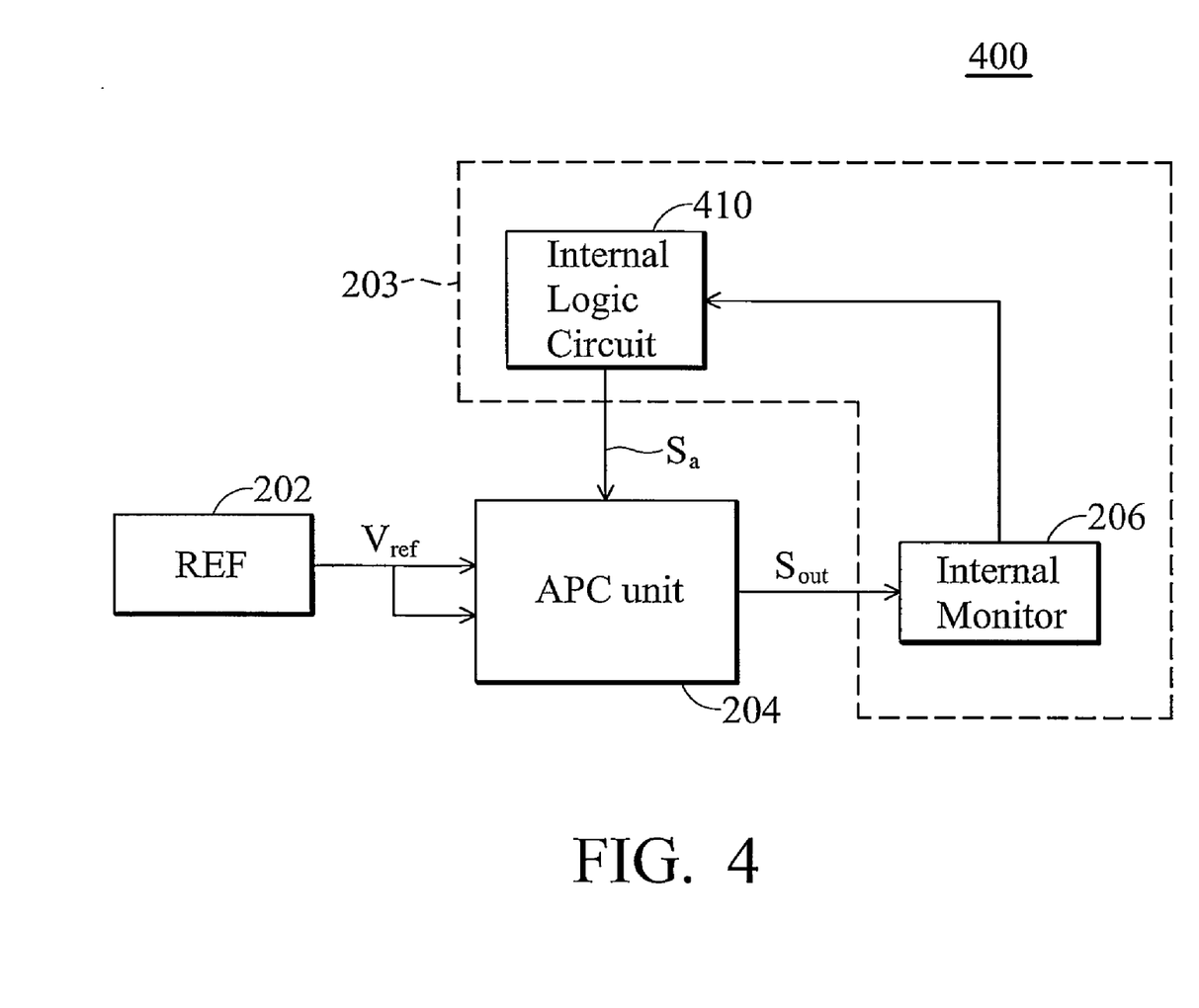
FIG. 4 shows another embodiment of an electronic system in a calibration mode.

FIG. 4 shows another embodiment of an electronic system in a calibration mode. The electronic system 400 is similar to the embodiment shown in FIG. 2, differing only in that an internal logic circuit 410 is used instead of the firmware unit 208 and the register unit 210. The internal logic unit 410 is a dedicated digital block used to practice the calibration process mentioned above. The internal logic unit 410 can be located within the IC.

Figure 5:
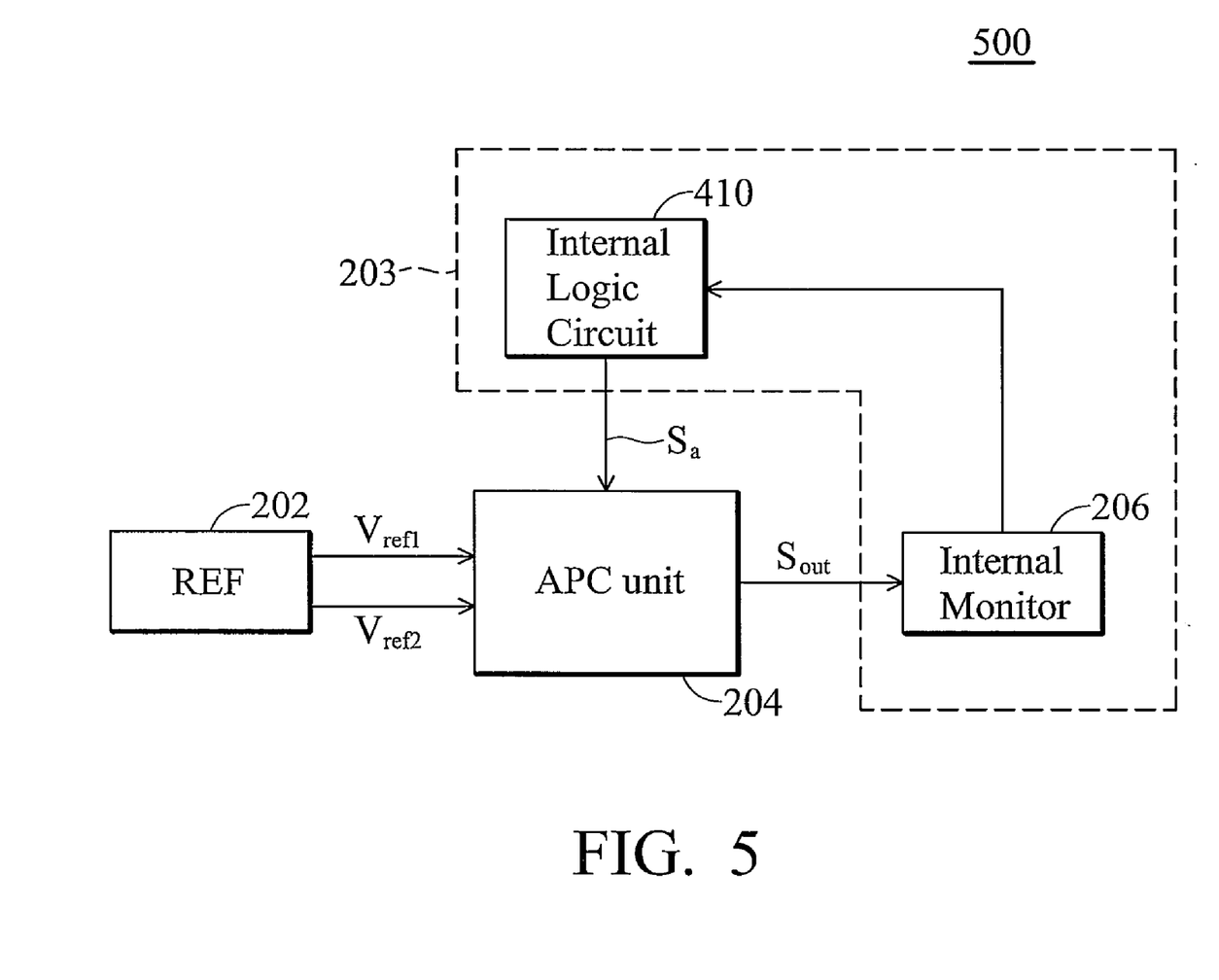
FIG. 5 shows another embodiment of an electronic system in a calibration mode.

FIG. 5 shows another embodiment of an electronic system in a calibration mode. The electronic system 500 is similar to the embodiment shown in FIG. 4, differing only in that two reference voltages ($V_{ref1}$ and $V_{ref2}$) are input to two terminals of the APC unit 204. After the calibration process mentioned above, a voltage adjustment $\Delta V$ is determined. Since the difference ($\Delta V_{ref}$) between reference voltages $V_{ref1}$ and $V_{ref2}$ is known, the actual voltage adjustment is equal to ($\Delta V + \Delta V_{ref}$). The actual voltage adjustment ($\Delta V + \Delta V_{ref}$) will be set to the APC unit 204 in a normal mode with close loop.

Figure 6:
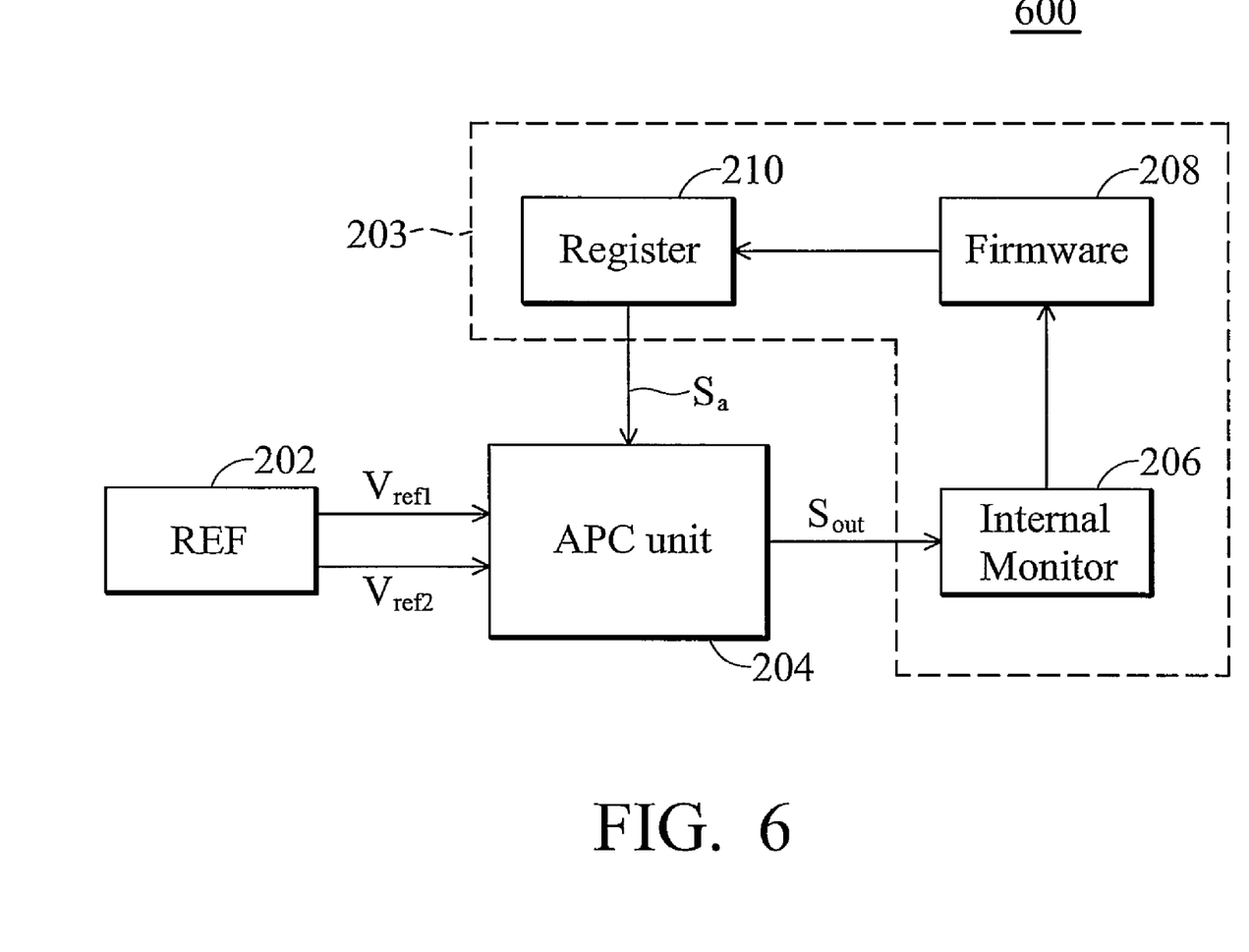
FIG. 6 shows another embodiment of an electronic system in a calibration mode.

FIG. 6 shows another embodiment of an electronic system in a calibration mode. The electronic system 600 is similar to the embodiment shown in FIG. 2, differing only in that two reference voltages ($V_{ref1}$ and $V_{ref2}$) are input to two terminals of the APC unit 204. After the calibration process mentioned above, a voltage adjustment $\Delta V$ is determined. Since the difference ($\Delta V_{ref}$) between $V_{ref1}$ and $V_{ref2}$ is known, the actual voltage adjustment is equal to ($\Delta V + \Delta V_{ref}$). The actual voltage adjustment ($\Delta V + \Delta V_{ref}$) will be set to the APC unit 204 in a normal mode with close loop.

Figure 7:
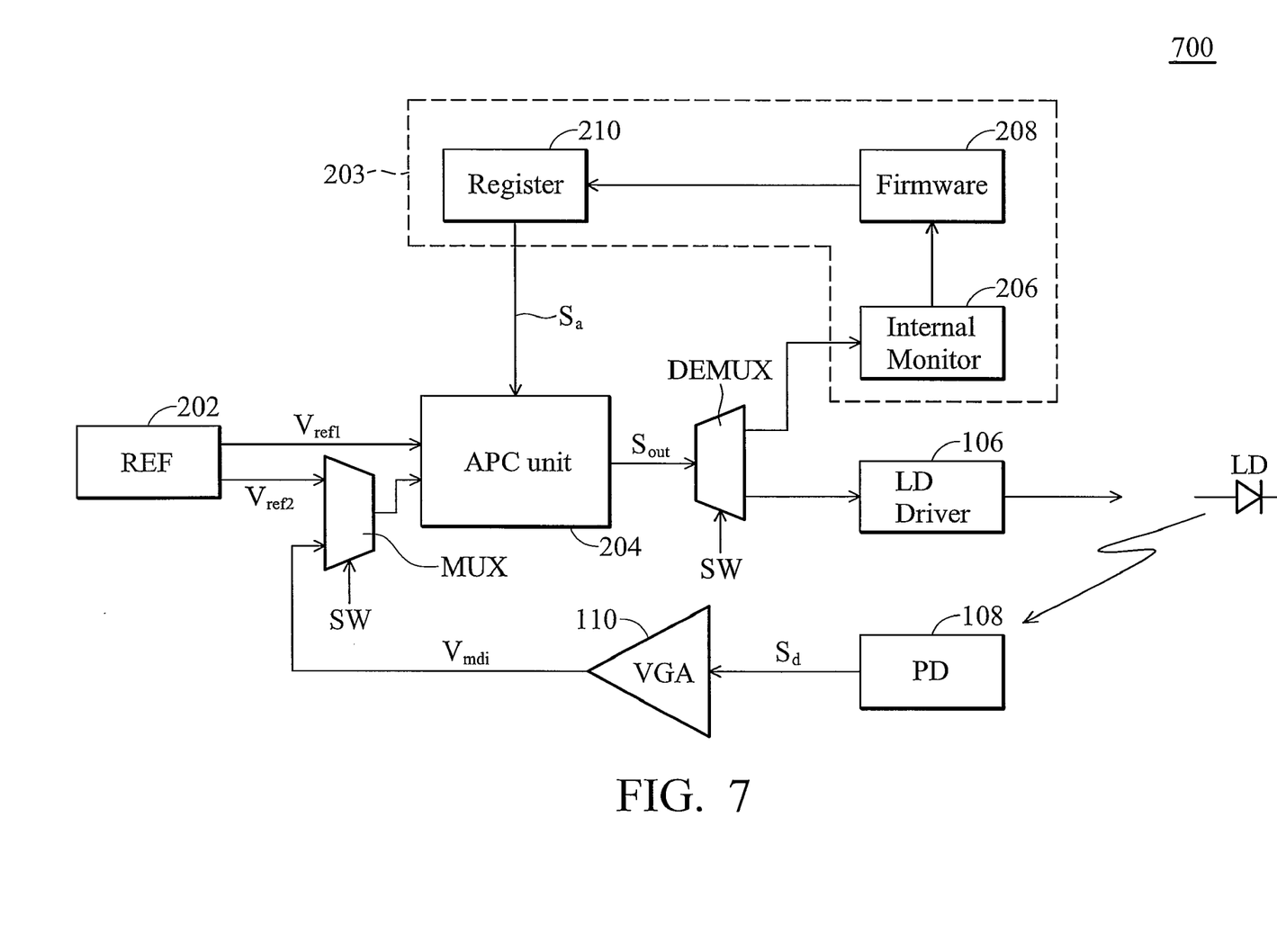
FIG. 7 shows an embodiment of an electronic system that can switch between a normal mode and a calibration mode.

FIG. 7 shows an embodiment of an electronic system that can switch between a normal mode and a calibration mode. With the implementation of a multiplexer MUX and a demultiplexer DEMUX, the electronic system 700 can switch between a normal mode and a calibration mode.

For example, in a calibration mode, $V_{ref2}$ is selected by the MUX to be input to the APC unit 204 and the output signal $S_{out}$ is selected by the DEMUX to be output to the internal monitor 206. Here the configuration is the same as the embodiment shown in FIG. 6. A calibration process can be performed as mentioned above.

After the calibration is completed, an actual voltage adjustment is obtained. The actual voltage adjustment is subsequently set to the APC unit 204. The electronic system 700 then switches back to a normal mode. In the normal mode, $V_{mdi}$ is selected by the MUX to be input to the APC unit 204 and the output signal $S_{out}$ is selected by the DEMUX to be output to the laser diode LD 106. Here the configuration is the same as the embodiment shown in FIG. 1, a close loop is formed, and the normal automatic power control function is performed by the close loop configuration.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic system comprising:
    an automatic power control (APC) unit receiving a first input signal through a first input terminal and receiving a second input signal through a second input terminal, the APC unit generating an output signal;
    an adjustment unit coupled to the first input terminal, the adjustment unit generating a voltage offset corresponding to an original voltage offset between the first and the second input terminals of the APC unit according to an adjustment signal; and
    a calibration unit providing the adjustment signal according to the output signal.

2. The electronic system as claimed in claim 1, wherein the first input terminal is coupled to the second input terminal in a calibration mode, and the first input signal is the same as the second input signal.

3. The electronic system as claimed in claim 1, wherein the calibration unit comprises a firmware unit.

4. The electronic system as claimed in claim 3, wherein the firmware unit comprises a micro processor, and a read only memory (ROM).

5. The electronic system as claimed in claim 4, wherein the calibration unit provides the adjustment signal with a series of values, the calibration unit monitors the output signal until the output signal changes states, the calibration unit further comprises a register unit, the firmware unit writes register values into the register unit, and the register unit keeps a register value when the output signal changes states.

6. The electronic system as claimed in claim 1, wherein the calibration unit comprises an internal logic circuit implemented within an integrated circuit.

7. The electronic system as claimed in claim 1, wherein when the output signal changes states, the adjustment unit stops changing the voltage offset.

8. An electronic system comprising:
    a reference signal source generating a first input signal and a second input signal;
    an automatic power control (APC) unit receiving the first input signal through a first input terminal and receiving the second input signal through a second input terminal, the APC unit generating an output signal;
    a calibration unit providing an adjustment signal according to the output signal; and
    a first adjustment unit coupled to the first input terminal, the adjustment unit generating a first voltage offset according to the adjustment signal.

9. The electronic system as claimed in claim 8, wherein the calibration unit provides the adjustment signal with a series of values and monitors the output signal until the output signal changes states.

10. The electronic system as claimed in claim 8, wherein the calibration unit comprises a firmware unit.

11. The electronic system as claimed in claim 8, wherein the calibration unit comprises an internal logic circuit implemented within an integrated circuit.

12. The electronic system as claimed in claim 8, further comprising a second adjustment unit coupled to the second input terminal, the second adjustment unit generating a second voltage offset according to the adjustment signal.

13. A calibration method for calibrating a voltage offset between a first input terminal and a second input terminal of an amplifier, the method comprising:
    providing a first input signal to the first input terminal;
    providing a second input signal to the second input terminal;
    providing an adjustment signal with a series of values to the first input terminal of the amplifier, wherein each value sets a voltage adjustment to the first input terminal;
    monitoring an output signal of the amplifier until the output signal changes states; and
    selecting the voltage adjustment made to the first input terminal when the output signal changes states.

14. The calibration method as claimed in claim 13, wherein the step of providing an adjustment signal is performed by a firmware unit.

15. The calibration method as claimed in claim 13, wherein the step of providing an adjustment signal is performed by an internal logic circuit implemented within an integrated circuit.

16. An electronic system comprising:
    an automatic power control (APC) unit receiving a first input signal through a first input terminal and receiving a second input signal through a second input terminal, the APC unit generating an output signal, the APC unit comprising an adjustment unit, the adjustment unit receiving the first input signal and generating a voltage offset corresponding to an original voltage offset between the first and second input terminals according to an adjustment signal; and
    a calibration unit providing the adjustment signal according to the output signal and determining the adjustment signal.

* * * * *